Inventor
Otto Ernst Heinrich Klemperer
By H. S. Grover
Attorney

Dec. 6, 1949     O. E. H. KLEMPERER     2,490,308
ELECTRON LENS SYSTEM
Filed Feb. 15, 1947     2 Sheets-Sheet 2

Inventor
Otto Ernst Heinrich Klemperer
By H. G. Grover
Attorney

Patented Dec. 6, 1949

2,490,308

UNITED STATES PATENT OFFICE 2,490,308

ELECTRON LENS SYSTEM

Otto Ernst Heinrich Klemperer, Iver, England, assignor to Electric and Musical Industries, Ltd., a British corporation Application February 15, 1947, Serial No. 728,866
In Great Britain September 30, 1944

Section 1, Public Law 690, August 8, 1946
Patent expires September 30, 1964

9 Claims. (Cl. 250—162)

The present invention relates to electron discharge apparatus such as cathode ray tubes and electron discharge devices in which a flattened or ribbon shaped electron beam is employed.

In modern cathode ray tubes where the cathode ray beam is of substantially circular cross-section, the cathode ray beam is projected from a cathode which operates in conjunction with a control electrode in the form of a cylinder surrounding the cathode and including a diaphragm in front of the cathode having an aperture for the emergence of the cathode ray beam. The control electrode is maintained at a negative, zero, or low positive potential with respect to the cathode and causes the beam from the cathode to converge so as to pass through a cross-over which is imaged on the screen of the tube by a subsequent focussing field which may be an electrostatic or magnetic field through which the beam passes. In order to increase the current in the beam at the cross-over, and hence at the image thereof it has been proposed to make the emitting surface of the cathode concave as seen from the cross-over.

In electrode systems for producing flattened or ribbon shaped electron beams, for example, for use in certain types of cathode ray tubes in electron discharge tubes for sound recording or in valves of the kind known as Klystrons, a cathode may be employed in conjunction with a control electrode having an elongated aperture through which the beam passes, the beam being caused to converge to form either a waist or a cross-over at a line parallel to the major axis or dimension of the aperture in the control electrode and this waist or cross-over is then imaged by a suitable focussing field to form a line image on the screen of the cathode ray tube or elsewhere to afford a region of high current intensity. However, as seen in planes extending longitudinally of the beam and parallel to the major axis of the slot aperture, the beam is not caused to converge.

I have found that, in electron discharge apparatus in which an electron beam of flattened or ribbon shaped cross-section is employed, if the beam entering the focussing field is made convergent as seen in a plane extending longitudinally of the beam and through the cross-over, the current intensity in the beam at an image formed by a focussing field can be improved.

The object of the present invention is to provide electron discharge apparatus having a simple arrangement for affording an electron beam of flattened or ribbon shaped cross-section which passes through a waist or through a line cross-over and which is convergent as seen in a plane extending longitudinally of the beam and through said cross-over.

The invention also provides improved electron discharge apparatus in which a flattened or ribbon shaped beam is employed and in which a line image is afforded in an improved manner.

According to the present invention electron discharge apparatus is provided including an electrode arrangement for affording a flattened or ribbon-shaped electron beam comprising a cathode, a control electrode, an anode, and a further electrode disposed between said cathode and anode and said cathode and said further electrode are so formed and arranged that if said cathode, said further electrode and said anode are maintained at suitable potentials, a flattened or ribbon-shaped electron beam will be afforded and a waist or cross-over will occur in said beam at a line substantially parallel to the major axis or dimension of the cross-section of said beam and equi-potential surfaces in the path of the beam in the vicinity of said cathode and said further electrode will be so convexly curved as seen from said cathode that said beam will be initially convergent as seen in the plane extending longitudinally of the beam parallel to said major axis or dimension.

One very advantageous application of the invention is to apparatus including electrodes for forming a focussing field of the form described in the specification of my application Serial No. 528,994, filed March 31, 1944, U. S. Patent 2,412,687 granted December 17, 1946. In such apparatus convergency in the beam produced according to the invention serves to off-set any divergence which may be produced due to the action of the focussing field on the beam as seen in a plane extending longitudinally of the beam and parallel to the major axis or dimension of the aperture in the control electrode. Thus according to a feature of the present invention electron discharge apparatus for producing and focussing a flattened or ribbon-shaped electron beam is provided comprising a cathode, an anode and a further electrode disposed between said cathode and anode, and a tubular electrode embraced by said anode, said tubular electrode having an end comprising a pair of oppositely disposed parts projecting further along the path of said beam than the parts of said end intermediate said oppositely disposed parts, the arrangement being such that if appropriate potentials with respect to said cathode are applied to said further electrode, said anode and said tubular electrode, a flattened or ribbon-shaped electron beam will be projected from said cathode and a waist or cross-over will occur in said beam at a line substantially parallel to the major axis or dimension of the cross-section of said beam and the focussing field about said end of said tubular electrode will cause said beam to form a line image of said waist or cross-over, the arrangement being such that equi-potential surfaces in the field through which said beam passes from said cathode and said further electrode are so convexly curved as seen from said cathode as to cause said beam to be initially convergent as seen in the plane extending longitudinally of the beam parallel to said major axis or dimension, whereby the divergence of said beam in said plane is made less than would otherwise be the case.

In one form of the invention the emissive surface of said cathode has a curved profile as seen in said plane for producing the desired curvature of said equi-potential surfaces.

In another form of the invention, the further electrode comprises a diaphragm having a portion extending beyond said diaphragm on the side thereof remote from the cathode, said portion serving to produce the desired curvature of said equi-potential surfaces. For example, said portion may have its edges curved to produce said desired curvature of said equi-potential surfaces, or the further electrode may consist of a cylindrical tube in which said diaphragm is mounted, the tube extending beyond the diaphragm to such an extent that the desired curvature is produced.

In order that the said invention may be clearly understood, and readily carried into effect it will be described in more detail with reference by way of example to the accompanying drawings in which:

Figure 1a is a diagrammatic sectional plan view of an electrode arrangement employed in apparatus embodying the invention, Figure 1b is a diagrammatic side elevation of the electrode arrangement shown in Figure 1a, Figure 1c is a diagrammatic perspective view of the electrode arrangement shown in the preceding figures, certain of the electrodes being shown broken away to reveal the disposition of parts in their interior;

Figure 1A:
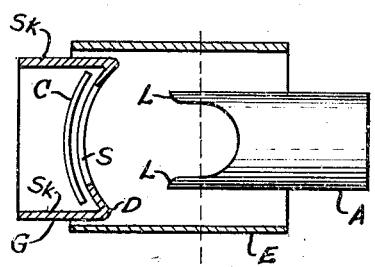
Figure 1B:
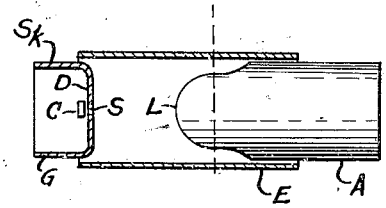
Figure 1C:
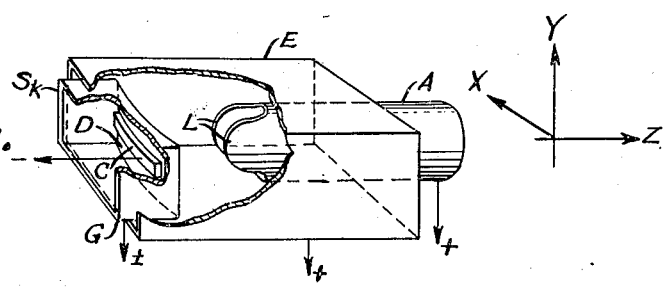
Figure 3A:
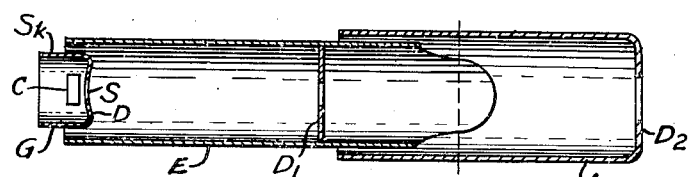
Figures 3a and 3b are views corresponding to Figures 1a and 1c of a further electrode arrangement for use in apparatus according to the invention.
Figure 3B:
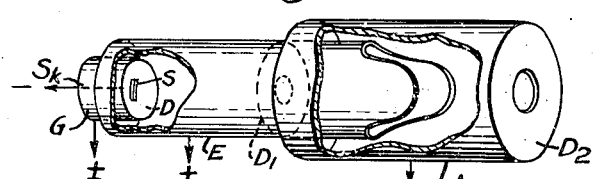
Figure 4A:
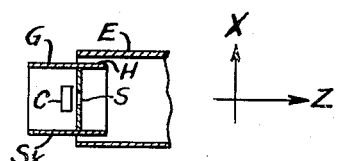
Figure 4B:
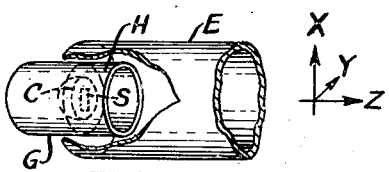
Figure 5B:
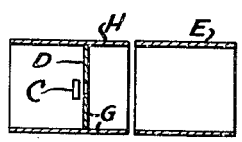
Figure 5A:
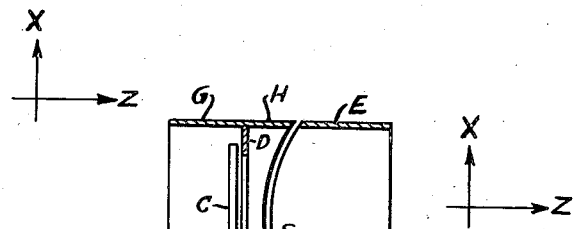
Figure 5C:
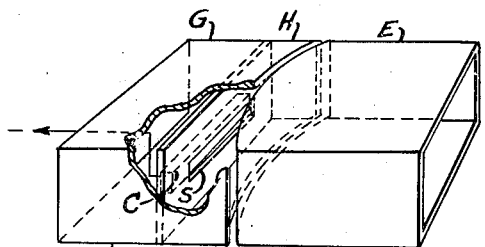

Figures 4a and 4b are similar to Figures 3a and 3b but relate to a further electrode arrangement, and Figures 5a, 5b and 5c are views corresponding to Figures 1a, 1b and 1c respectively of a still further electrode arrangement for use in apparatus according to the invention.

All the electrode arrangements shown in the drawing have an axis of symmetry indicated by the arrow Z, and referred to herein as the Z-axis, and will be described by reference to this axis, and a further pair of axes indicated by the arrows X and Y, respectively, and referred to herein as the X-axis and the Y-axis, respectively, and forming with the Z-axis a system of mutually perpendicular axes of reference. Each of the arrangements is intended to produce a flattened or ribbon-shaped beam having a substantially rectangular cross-section which is projected along the Z-axis with the longer dimension or the major axis of its cross-section parallel to the X-axis and the shorter dimension or minor axis of its cross-section parallel to the Y-axis.

The views shown in Figures 1a, 2a, 3a, 4a and 5a, respectively, are taken in the plane of the X and Z axes referred to herein as the XZ plane and the views shown in Figures 1b and 5b, respectively, are taken in the plane of the Y and Z axes referred to herein as YZ plane.

In all the figures of the drawing the corresponding elements are indicated by the same reference characters.

The arrangement shown in Figures 1a, 1b, and 1c comprises a cathode C, a further or control electrode G, a first anode E and a tubular electrode A which constitutes the second anode.

The cathode C is in the form of a curved strip, its emissive surface being presented to an aperture S in the form of a slot in the diaphragm D of the control electrode G and shown as conforming to a cylindrical surface having an axis parallel to the Y-axis but which may depart from the form of a simple circular arc if desired. The control electrode G comprises the diaphragm D and a tubular skirt Sk of rectangular cross-section surrounding the diaphragm. The diaphragm D is curved so that the aperture S conforms closely with the emissive surface of the cathode C. The tubular electrode A is of circular cross-section and is formed with a pair of oppositely disposed extensions L on its end within the anode E and presented to the control electrode G, these extensions being formed in the manner described in detail with reference to and shown in Figures 4A, 4B, 4C, and 4D of the drawings accompanying the complete specification of my copending application Serial No. 528,994, filed March 31, 1944, the edge of said end of said anode A as developed in a plane being constituted by a series of four semi-circular arcs, adjacent arcs being of opposite curvature.

If the anodes E and A are maintained at suitable positive potentials with respect to the cathode C, the anode A being at a higher potential than anode E, and the control electrode is maintained at a suitable low, zero, or negative potential with respect to the cathode, a beam of electrons of substantially rectangular cross-section will be projected from the emissive surface of cathode C through the aperture S in diaphragm D and through the anodes E and A, the beam being caused to pass through a cross-over at a line near the cathode C and diaphragm D and being focussed, due to the focussing field set up due to the projections L of the anode A within the anode E, so as to form a line image of the cross-over.

Figure 2A:
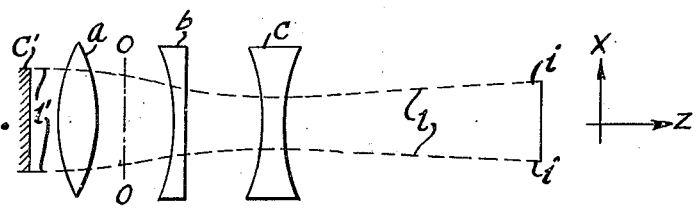
Figures 2a and 2b are diagrammatic representations of a glass-optical system analogous to the electron-optical electrode arrangement of the preceding figures.
Figure 2B:
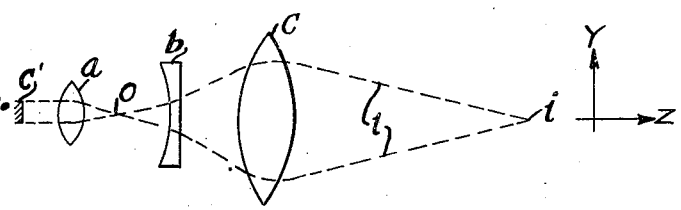

The action of the arrangement of Figures 1a, 1b and 1c will be readily appreciated by reference to the Figures 2a and 2b.

In these figures, the cathode is represented at C' as having a plane emitting surface, from which a beam indicated by the dotted line l is projected into the element a which is equivalent to the field produced between the emitting surface of the cathode C (Figures 1a, 1b and 1c) and the control electrode G. As seen in the XZ plane, the curvature of the equi-potential surfaces in this field is substantially that of the cathode C and diaphragm D. The beam is thus caused to converge slightly as seen in this plane. Thus, the element a is represented in Figure 2a as being convex glass-lens of long focal length from which the beam l emerges with a slight convergence.

As seen in the YZ plane, the curvature of the equipotential surfaces in the field between the cathode C and the control electrode G is very marked and the electron beam is caused to converge rapidly to a cross-over at a line represented at o in Figures 2a and 2b. As usual with electron gun systems, the cross-over o is imaged by the focussing field between the anodes E and A to produce a line image, for example, on the surface of a fluorescent screen or in some other region where it is desired to converge the beam. The distance of the cross-over o from the cathode depends on the spacing between the cathode and the diaphragm D of the control electrode G and also on the curvature of the emissive surface of the cathode as seen in the YZ plane as well as on the potential of the control electrode G with respect to the cathode. In the case shown in Figures 1a, 1b and 1c the emissive surface of the cathode has no curvature as seen in the YZ plane, but it could be made concave as seen in this plane towards the cross-over o.

In the electrostatic field set up immediately to the right of the electrode G in Figures 1a, 1b and 1c due to the presence of the first anode E, most of the equi-potential surfaces are concave as seen from the electrode G and as seen in both the XZ and YZ planes, and the field appears to exert a slight diverging action on the beam as represented by the element b in Figures 2a and 2b, respectively, the two focal lengths of the field being in general different and depending on the width of anode E parallel to the X-axis and its depth parallel to the Y-axis.

The focussing field produced about the projections L on the end of the second anode A within the first anode E is represented by the element c of Figures 2a and 2b. This field serves to focus the electron beam to form a line image at i in Figures 2a and 2b. The element c is thus shown in Figure 2b as being a highly converging lens. At the same time, as explained in the specification of my aforesaid application Serial No. 528,994, the action of the focussing field will cause the electron beam to diverge so that its dimension in the XZ plane becomes progressively greater after passing through the focussing field. Thus, in Figure 2a the element o is represented as being a diverging lens.

It will be readily appreciated from Figure 2a that the convergence produced by the element a in the XZ plane will serve to neutralize wholly or partly the diverging action of the element c. Thus, if the curvature of the emissive surface of the cathode C as seen in the XZ plane is suitably chosen, the divergence of the focussing field between the projection L of electrode A can be prevented from causing undesired spreading of the beam.

For the focussing action due to the curvature of the cathode C to oppose the diverging action of the focussing field between the projections L of the electrode A in Figures 1a, 1b and 1c, it is desirable to arrange electrode A so close to the cathode that the beam is not focussed to form a line image in the XZ plane before entering the focussing field, otherwise the divergence of the beam at the line image i will be enhanced instead of reduced. Furthermore, the curving of the cathode in the XZ plane serves to reduce the width of the beam in this plane so that the beam only just fills the focussing lens within the corrected part of its aperture. Thus an arrangement according to the invention has an advantage even if a line image is formed before the beam enters the focussing field, provided this line image is sufficiently close to the focussing field represented by element c in Figure 2a.

In one arrangement according to Figures 1a, 1b and 1c, the aperture S in the diaphragm D of the control electrode G had a length parallel to the X-axis of 20 mm. and a width of 1 mm., the diaphragm D having a radius of curvature of 20 mm. as seen in the XZ plane. The electrode E had a width parallel to the X-axis of 35 mm. and a depth parallel to the Y-axis of 25 mm. The tubular electrode A had a radius of 9 mm., the radii of the arcs defining the projections L being approximately 8 mm. The distance between the middle of the cathode and the plane of the centers of the aforesaid arcs was 18 mm. The positive potentials on the two anodes E and A were 370 volts and 400 volts, respectively, and the potential on the control electrode G was adjusted so that the cross-over o occurred at a distance of 14 mm. from the middle of the cathode. This arrangement gave an emission current from the cathode of 0.5 ma. and practically the whole of the emission current passed into the desired line image i.

In the arrangement shown in Figures 3a and 3b of the drawings, the control electrode G and the anode E are both in the form of cylindrical tubes, and the diaphragm D of the control electrode G and the emissive surface of the cathode C are similarly and spherically curved. The anode E has its end remote from the control electrode G inserted in the end of the second anode A and the projections L are provided on the end of anode E. The anodes E and A each include diaphragms $D_1$ and $D_2$, respectively, with circular apertures, these diaphragms preventing undue spreading of the beam in the direction of the X-axis. Either or both diaphragms $D_1$ and $D_2$ may intercept electrons in the beam.

The mode of operation of the arrangement of Figures 3a and 3b is generally similar to that of the arrangement shown in Figures 1a, 1b and 1c as described with reference to Figures 2a and 2b.

In a particular construction in accordance with Figures 3a and 3b, the diameter of cathode C was 6 mm., the radius of curvature of the emissive surface of the cathode being 15 mm. The radius of the anode E was 9 mm., and the radii of the arcs defining its projections L were again about 8 mm. The diameter of the second anode A was 25 mm.

With the aperture S in diaphragm D 4 mm. long and 0.5 mm. wide, the focussing field between projections L was found to produce an extremely fine line image. With the mid-plane of focussing field (namely the plane of the centers of the arcs defining the projections L) 70 mm. from the beam cross-over near the cathode and the distance of the line image formed by the focussing field from the aforesaid plane also 70 mm., the line image was only 0.1 mm. wide over a length of 10 mm. However, in this case the beam current passing through the image was small, being only about 10 microamps with a second anode potential of 400 volts.

If a high current intensity is desired rather than a sharp line image, an arrangement similar to that shown in Figures 3a and 3b can be employed in which the anode E is formed without any projections such as L on its end so that a plain two-tube lens with a rotationally symmetrical focussing field of well known form is obtained. Such a focussing field does not produce any divergence of the electron beam. In a particular case where the potential on the first anode E was 500 volts and on the second anode A 4500 volts, it was found that a line image 3 mm. long and 0.3 mm. wide could be obtained through which a beam current of 300 microamps passed. In this case a current cut-off was obtained when the potential on the control electrode G was 10 volts negative.

It is possible also that for some purposes it might be advantageous to employ a magnetic focussing field in the arrangement of Figures 3a and 3b instead of an electrostatic focussing field. The use of a magnetic focussing field might give rise to difficulties due to image twist but these difficulties could probably be overcome in practice.

Instead of using a cathode and a control electrode which are curved as seen in the XZ plane in the manner shown in Figure 1a or 3a it is possible to produce the desired curvature of the equipotentials in the vicinity of the emissive surface of the cathode in the aperture S in the diaphragm D of the control electrode G by extending the skirt Sk of the control electrode G beyond the diaphragm D. For example, in the arrangement shown in Figures 4a and 4b the control electrode G which is of cylindrical form has a simple extension H beyond the diaphragm D, the end of this extension remote from the cathode conforming to a plane, and the diaphragm D and the emissive surface of the cathode C also being plane.

In a particular construction according to Figures 4a and 4b the dimensions of the electrodes C, G, E and A were generally similar to those indicated above with reference to Figures 3a and 3b, the extension H of the control electrode G being formed with an axial length of 4 mm. It was found in this arrangement that the converging effect of the control electrode-cathode field as seen in the XZ plane was similar to that produced in the particular example described with reference to Figures 3a and 3b in which the radius of the emissive surface of the cathode was 15 mm. However, where the control electrode is extended in the manner shown in Figures 4a and 4b the penetration factor of the arrangement is smaller than where the emissive surface of the cathode and the diaphragm D are curved, so that potentials on the anodes must be higher to produce the same beam current. The penetration factor, however, may be changed by varying the spacing between the emissive surface of the cathode C and the diaphragm D of the control electrode G, this spacing being made smaller to increase the penetration factor. It will be appreciated that the increase of the penetration factor obtainable by decreasing the spacing between the cathode C and the diaphragm D is limited due to mechanical and electrical considerations. Moreover, the arrangement of Figures 3a and 3b gives a sharper line image than the arrangement of Figures 4a and 4b, probably because with an arrangement in which the emissive surface of the cathode C and diaphragm D are curved the spherical aberration is smaller than where the emissive surface and the diaphragm are plane.

Where the control electrode G and the anode E are of rectangular form as seen in Figure 1c it is possible to extend the control electrode in the manner indicated with reference to Figures 4a and 4b and employ a straight cathode strip and plane diaphragm D, as shown in Figures 5a, 5b and 5c. However, in this case in order to produce the desired curvature of the equi-potentials in the vicinity of the emissive surface of the cathode C and the diaphragm D, the edges of the opposite sides of the extension H of the electrode G parallel to the X-axis must be curved in the manner shown in Figures 5a and 5c, the adjacent edges of the anode E being preferably curved in a manner complementary to those of extension H of the control electrode G.

The arrangement of Figures 5a, 5b and 5c also has a lower penetration factor than the arrangement according to Figures 1a, 1b and 1c and requires higher anode voltages to produce the same beam current for the same control-electrode cathode spacings.

It will be appreciated that in Figures 4a and 4b and 5a, 5b and 5c the second anode A is not shown as only the forms of the cathode C, control electrode G and first anode E are modified.

It may also be possible to employ an arrangement similar to that shown in Figures 3a and 3b in which an anode diaphragm with a slot aperture is inserted behind the control electrode G as seen from the cathode. Such an arrangement, however, would probably not be desirable in an electron gun for use in a cathode ray tube for television reception, since for this purpose a relatively high impedance tube is preferred. With the arrangement of Figures 3a and 3b the range of control voltage on the control electrode is 10 volts for the control of a beam current of 300 microamps, and this compares favorably with a range of about 20 volts for controlling about the same beam current in a standard television tube.

It is believed that any arrangement according to the invention will also be found to be advantageous with respect to the space charge effects therein, and it should be possible to obtain a higher current intensity in a small line image than can be obtained with an image produced with a beam of circular cross-section and having the same area.

Although in the above description of the embodiments of the invention the electrode G is referred to as a control electrode, it is to be understood that in some cases the electrode G need not function as a control electrode but may merely serve the function of a cathode screen. Furthermore the electrode G need not necessarily be formed with an elongated slot and in an alternative arrangement the electrode G may comprise a pair of plates embacing the longer sides of the cathode, said plates having outwardly turned extensions according to the recommendation of Pierce and others.

I claim as my invention:

1. An electron optical system effectively providing cylindrical lens characteristics for affording an electron beam of substantially rectangular cross-section, comprising a cathode for generating an electron beam, first and second anodes, and means disposed between said cathode and said first anode, said means having a portion conforming to and spaced from the surface of said cathode to provide a cross-over of said beam in a line substantially parallel to the major axis of the cross-section of said beam, and providing equipotential surfaces in the path of said beam in the vicinity of said cathode so that said beam is initially convergent in the longitudinal plane of said beam parallel to said major cross-sectional axis thereof, said first anode being coaxial with and partially surrounding said second anode, and said second anode being tubular and including a pair of oppositely disposed convex projections extending toward said cathode.

2. An electron optical system effectively providing cylindrical lens characteristics for affording an electron beam of substantially rectangular cross-section, comprising a cathode for generating an electron beam, first and second anodes, and means disposed between said cathode and said first anode, said means having a portion conforming to and spaced from the surface of said cathode to provide a cross-over of said beam in a line substantially parallel to the major axis of the cross-section of said beam, and providing equi-potential surfaces in the path of said beam in the vicinity of said cathode so that said beam is initially convergent in the longitudinal plane of said beam parallel to said major cross-sectional axis thereof, said first anode being coaxial with and partially surrounding said second anode, and said second anode being of circular cross-section and including a pair of oppositely disposed convex projections extending toward said cathode.

3. An electron optical system effectively providing cylindrical lens characteristics for affording an electron beam of substantially rectangular cross-section, comprising a cathode for generating an electron beam, a control electrode, first and second anodes and a further electrode disposed between said cathode and said first anode, a source of potentials for said anodes and further electrode, said further electrode having a portion conforming to and spaced from the surface of said cathode and said potentials on said anodes and further electrode being selected to provide a cross-over of said beam in a line substantially parallel to the major axis of the cross-section of said beam, and means providing curved equi-potential surfaces in the path of said beam in the vicinity of said cathode so that said further cathode is effectively convexly curved in the path of said cathode whereby said beam is initially convergent in the longitudinal plane of said beam parallel to said major cross-sectional axis thereof, said first anode being coaxial with and partially surrounding said second anode, and said second anode being of circular cross-section and including a pair of oppositely disposed convex projections extending toward said cathode.

4. An electron optical system effectively providing cylindrical lens characteristics for affording an electron beam of substantially rectangular cross-section, comprising a cathode for generating an electron beam, a control electrode, an anode and a further electrode disposed between said cathode and said anode, a tubular electrode at least partially enclosed by said anode, said tubular electrode having one end comprising a pair of oppositely disposed portions projecting further along the axis of said beam than the portions of said end intermediate said projecting portions, a source of potentials for said anodes, tubular and further electrodes, said tubular and said further electrodes having a portion conforming to and spaced from the surface of said cathode and said potentials on said anode, said tubular and further electrodes being selected so that the focusing field about said end of said tubular electrode provides a cross-over of said beam in a line substantially parallel to the major axis of the cross-section of said beam, and means providing curved equi-potential surfaces in the path of said beam in the vicinity of said cathode so that said further electrode is effectively convexly curved in the path of said cathode whereby said beam is initially convergent in the longitudinal plane of said beam parallel to said major cross-sectional axis thereof, said tubular electrode being coaxial with and telescoped wth said anode.

5. Electron discharge apparatus according to claim 3 wherein said further electrode comprises a diaphragm and has a portion extending beyond said diaphragm on the side thereon remote from the cathode, said portion serving to produce said curvature of said equi-potential surfaces.

6. Electron discharge apparatus according to claim 3 wherein said further electrode comprises a diaphragm and has a portion extending beyond said diaphragm on the side thereon remote from the cathode, said portion has its edges curved to produce said curvature of said equi-potential surfaces.

7. Electron discharge apparatus according to claim 3 wherein said further electrode comprises a cylindrical tube having a diaphragm therein, said tube having a portion thereof extending beyond said diaphragm to a sufficient extent to produce said curvature of said equi-potential surfaces.

8. Electron discharge apparatus including an electrode arrangement for affording a flattened or ribbon-shaped electron beam comprising a cathode for generating an electron beam, a control electrode, first and second anodes, and a further electrode disposed between said cathode and said first anode, said cathode and said further electrode having adjacent portions of similar conformation and uniform spacing therebetween to provide a cross-over of said beam in a line substantially parallel to the major axis of the cross-section of said beam, and providing equipotential surfaces in the path of said beam in the vicinity of said cathode so that said beam is initially convergent in the longitudinal plane of said beam parallel to said major cross-sectional axis thereof, said first and second anodes being in coaxial telescopic relation, and one of said anodes having a pair of oppositely disposed convex projections extending longitudinally of the path of said beam.

9. Electron discharge apparatus including an electrode arrangement for affording a flattened or ribbon-shaped electron beam comprising a cathode for generating an electron beam, an anode, a further electrode disposed between said cathode and said anode and a tubular electrode embraced by said anodes, said tubular electrode having a pair of oppositely disposed convex projections extending longitudinally of the path of said beam, said cathode and said further electrode having adjacent portions of similar conformation and uniform spacing therebetween to provide a cross-over of said beam in a line substantially parallel to the major axis of the cross-section of said beam, and providing equipotential surfaces in the path of said beam in the vicinity of said cathode so that said beam is initially convergent in the longitudinal plane of said beam parallel to said major cross-sectional axis thereof.

OTTO ERNST HEINRICH KLEMPERER.

REFERENCES CITED

The following references are of record in the file of this patent:

UNITED STATES PATENTS

| Number | Name | Date |
|---|---|---|
| 2,100,701 | Schlesinger | Nov. 30, 1937 |
| 2,111,231 | Von Ardenne | Mar. 15, 1938 |
| 2,223,908 | Bull | Dec. 3, 1940 |

OTHER REFERENCES

Ser. No. 430,602, Coeterier, (A. P. C.), published May 25, 1943.